April 20, 1954        G. H. ACKER        2,675,713
PROTECTIVE MECHANISM FOR VARIABLE SPEED FRICTIONAL DRIVES
Filed July 23, 1952
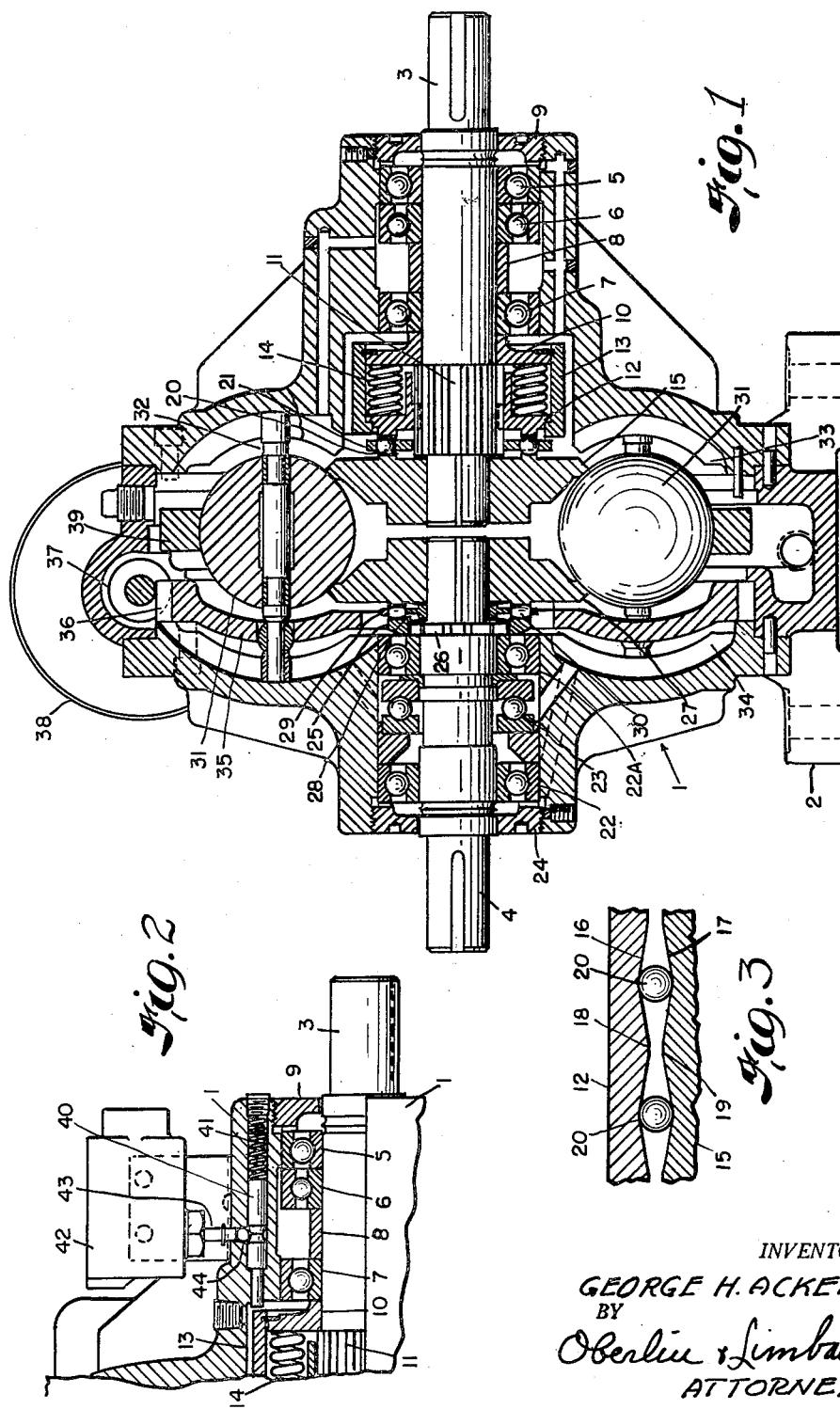
INVENTOR.
GEORGE H. ACKER
BY
Oberlin & Limbach
ATTORNEYS.

Patented Apr. 20, 1954

2,675,713

UNITED STATES PATENT OFFICE 2,675,713

PROTECTIVE MECHANISM FOR VARIABLE SPEED FRICTIONAL DRIVES

George H. Acker, Shaker Heights, Ohio, assignor to The Cleveland Worm & Gear Company, Cleveland, Ohio, a corporation of Ohio Application July 23, 1952, Serial No. 300,433

10 Claims. (Cl. 74—472)

This invention relates as indicated to protective mechanism for variable speed frictional drives, and more particularly to protective mechanism adapted to be utilized in conjunction with change speed mechanism of the general type disclosed and claimed in U. S. Patent No. 2,469,653, which issued to Jean Kopp on May 10, 1949.

Reference may be had to the above Kopp patent for a more detailed explanation of the construction and operation of the device there disclosed, it being understood that such device may comprise two axially aligned shafts, one the drive shaft and the other the driven shaft, having discs mounted on their respective opposed ends adapted to engage and rotate a number of balls interposed between their outer peripheries. By tilting the axes of rotation of such balls, the driven shaft may be caused to rotate at a speed either greater or less than the speed of the drive shaft, and a smooth transition is obtainable from one speed to another.

A device of this nature is desirably designed to vary the contact pressure between the tractive surfaces in proportion to the torque being transmitted thereby, such pressure acting in the direction of the axis of the aligned shafts. Theoretically, any demand for torque transmission beyond the design capacity of the device would be accompanied by a proportionate increase in the effective pressure on the tractive surfaces adequate to prevent any slippage, regardless of the degree of overload. In practical construction, however, the possible axial elastic deflection of the device is greater than the axial displacement which can be realized with the pressure mechanism, and therefore the torque may in cases of sudden overload exceed that productive of maximum axial displacement. When this occurs, the pressure mechanism is no longer adequate to produce proportional loading on the tractive surfaces and destructive slippage may result.

It is accordingly a principal object of the present invention to provide protective mechanism for frictional variable speed power transmitting devices such as that disclosed in U. S. Patent No. 2,469,653.

Another object of my invention is to provide means effective to eliminate the hazard of destruction of the frictional driving surfaces incidental to application of sudden overload to such device.

A further object is to provide such protective mechanism which will be automatic in operation, relatively inexpensive of construction and not subject to excessive wear or distortion.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a vertical longitudinal section through a variable speed drive mechanism of the general type disclosed in Kopp Patent No. 2,469,653 but incorporating my novel protective device;

Fig. 2 is a fragmentary top plan view, partly in horizontal section, showing one manner of stopping the drive means in response to excessive overload; and Fig. 3 is a fragmentary developed sectional view of the opposed cam surfaces of my new mechanism whereby protection of the drive means from excessive overload is effected.

Now referring more particularly to such drawing and especially Fig. 1 thereof, the embodiment of my invention there illustrated comprises a housing indicated generally at 1 being formed with a base portion 2 and having a drive shaft 3 and an axially aligned driven shaft 4 journalled in such housing. Shaft 3 is thus journalled in ball bearing 5, angular contact bearing 6 and ball bearing 7 with a spacer ring 8 being interposed between the races of such latter bearings. An adjustment ring 9 is threaded into the housing to retain the bearings in place.

A back-up plate or ring 10 is interposed between bearing 7 and splined shoulder 11 on shaft 3. An input loading cam member 12 in the form of an internally splined annulus is mounted on such shoulder 11 for reciprocation axially of shaft 3 and for rotation therewith due to interengagement of such splines. An outer sleeve 13 surrounds such cam member and back-up plate 10 and encloses a plurality of preloaded helical springs 14 interposed between such backup plate 10 and such cam member 12.

Freely rotatably mounted on the inner end of shaft 3 is an input drive disc 15 having a cam surface opposed to the cam surface of member 12. Such opposed cam surfaces, shown in developed form in Fig. 3, comprise a plurality of shallow V-notches 16 and 17 separated by flats such as 18 and 19. Balls or spherical rollers 20, rotatively held in a retainer washer 21, are interposed between each pair of notches 16 and 17, and when properly adjusted, such balls or rollers rest at the bottoms of their respective V-notches without appreciable play when no torque is being transmitted.

The driven or "output drive" shaft 4 is journalled in ball bearings 22 and 22A with a ball thrust bearing 23 interposed therebetween with suitable spacer rings and collars. An adjustment ring 24 is threaded into the housing to secure such bearing assembly in place.

An internally splined annular disc 25 is interengaged with spline shoulder 26 on shaft 4 for axial movement relative thereto but rotation therewith. Such disc 25 has a cam surface generally similar to that of cam member 12 opposed to a similar surface on output drive disc 27 which is freely rotatably mounted on the inner end portion of shaft 4 and urged forwardly by a spring dished washer 28 acting against shoulder 26. A spherangular bearing assembly comprising a cage 29 and rollers 30 is interposed between the shallow V-shaped cam surfaces on discs 25 and 27 in substantially the same manner indicated in Fig. 3.

Interposed between the opposed drive discs 15 and 27 are a plurality of balls 31 mounted on axles 32 lying in planes radial to the axis of shafts 3 and 4. The ends of such axles are supported in guideways such as 33 and 34 permitting such axles to be tilted in such planes. Obviously, when the axles are parallel to the axis of shafts 3 and 4 as shown in Fig. 1, the frictional drive from shaft 3 through disc 15, balls 31, and disc 27 to shaft 4 will be effective to rotate shaft 4 at the same rate as shaft 3. By tilting such axles 32, the speed ratio may be varied as explained in Kopp Patent No. 2,469,653.

In order thus to tilt such axles, a speed adjuster disc 35 is provided adapted to be turned about the axis of shaft 4 and having inclined slots through which the respective axles 32 pass. The outer periphery of such disc 35 is provided with gear teeth 36 meshing with worm 37 adapted to be turned through hand wheel 38. Disc 35 may accordingly be turned and set at a position to incline the axles of balls 31 at a degree to the axis of shafts 3 and 4 to effect the desired speed change ratio. A ball ring 39 closely encircles the assemblage of balls 31 to prevent radially outward movement of the latter under the effect of operating stresses. Adjusting rings 9 and 24 are operative to take up free play in the mechanism so that there will be an initial frictional contact between balls 31 and discs 15 and 27. Thus, ring 9 maintains plate 10 against shoulder 11 thereby removing initial play from the bearings 5, 6 and 7, and ring 24 slightly compresses spring dished washer 28 between shoulder 26 and disc 27 to create the initial axial pressure necessary to properly locate both the rollers 30 and the balls 20 at the bottoms of their respective V-notches.

Of course, as previously indicated, the general type of speed change device described above is not my invention, but only that part provided to eliminate the hazard of destruction of the frictional driving surfaces incidental to the possible application of sudden overloads. Such an overload may create a torque greater than that necessary to produce maximum axial displacement of the device, in which case the cam and ball pressure devices are no longer adequate to produce proportional loading on the tractive surfaces. As a result, slipping may take place between the surfaces of disc members 15 and 27 and balls 31, scoring such surfaces and putting the device out of action.

My above-described improvement whereby the cam member 12 is resiliently backed up by preloaded springs 14 serves to limit the internal axial pressures that may be developed to a safe magnitude; provides a point of slippage other than the traction surfaces when subjected to excessive torque; and is adapted to provide a means for de-energizing the drive motor when the design limit torque is exceeded, as explained below.

When the output torque is greater than the input torque, which is the case when the output speed is less than the input speed, the opposed cam surfaces of the pressure-developing mechanism on the output side must transmit this higher torque and, in doing so, the two members 25 and 27 are shifted slightly in angular relationship as the interposed rollers 30 ride up the cam surfaces and separate them by the elastic yield of the whole structure resulting from the developed axial pressure. Such pressure is transmitted through the driving discs or cones 30 and 15 and balls 31 to the input side of the device so that the balls or rollers 20 are subjected to substantially the same axial pressure as those on the output side, but since the input torque is of lower magnitude than the output torque such axial pressure is sufficient to afford transmission of the input torque through the input pressure mechanism without relative angular movement of the cam surfaces on member 12 and disc 15, and balls 20 remain in the bottoms of their V-notches.

On the other hand, when the output speed equals or exceeds the input speed, the input torque will exceed the output torque and the axial pressure established within the device will be determined by the pressure mechanism on the input side.

On the input side, disc or cone 15 abuts directly against shoulder 11 (or the thrust washer interposed therebetween). The plurality of preloaded springs 14 normally exert a total axial force slightly greater than that required to maintain traction in the device under its maximum input torque rating. This axial force is exerted against back-up plate 10 and cam member 12, both such elements being interengaged through sleeve 13. Consequently, to any axial pressure of less magnitude, the assembly 10, 12, 14, acts like a solid body and is unyielding, while under greater axial pressures the springs will yield and permit sleeve 13 and cam member 12 to shift axially of shaft 3 toward the outer end of the latter.

Referring now also to Fig. 2 of the drawing, I may provide a plunger 40 mounted in housing 1 for reciprocation parallel to the axis of shaft 3 and adapted to be engaged by the end of sleeve 13 to effect such reciprocation against the force of spring 41. An electric limit switch 42 (microswitch) is mounted on housing 1 and its operating plunger 43 engages ball 44 against a reduced portion of plunger 40. Such limit switch may obviously be connected in circuit with an electric motor drive for shaft 3 or otherwise employed to actuate power disconnecting or braking news means so that axial shifting or sleeve 13 as above described will serve to operate such switch to stop the drive. Scoring and other damage to the device are thus avoided when excessive overloads are imposed.

When the device is operating as a speed reducer, the output torque will be greater than the input torque. If the latter does not exceed the design value, the pressure mechanism on the output side functions in the usual way to build up proportional axial pressure. It will be noted, however, that the pressure exerted by the output pressure mechanism 25, 30, 27, forces output driving cone 27 against the driving balls 31; these balls are forced against the input drive cone 15 but at this point the axial thrust, instead of being transmitted through the input pressure mechanism, is taken by shoulder 11 (and the interposed thrust washer) on shaft 3. This axial thrust is accordingly now further transmitted through back-up plate 10, bearing 7, spacer ring 8, bearings 6 and 5, and adjusting ring 9 to housing 1.

The balls 20 in the input pressure mechanism are not therefore loaded by the output pressure mechanism including rollers 30 under the described operating conditions and have nothing to do with determining the axial force acting between the two discs or cones 15 and 27. They must, however, transmit the input torque from the input loading member 12 to the input drive disc or cone 15, and thus some axial pressure is built up between these two members through such balls 20. This does not increase the over-all thrust exerted by back-up plate 10, for example, but rather tends to reduce the thrust transmitted through splined shoulder 11 directly to cone 15.

As long as the axial pressure developed between the opposed cam faces of cone 15 and member 12 in transmitting the input torque does not exceed the preload compression of the springs 14, these springs do not yield and the cam faces of notches 16 and 17 are not further separated. When, however, the input torque exceeds the design value, the axial pressure developed by such cam faces of the pressure mechanism will exceed the preload on such springs and the latter will yield, permitting further separation of the cam faces until the torque generated axial pressure balances the new spring loading. If the input torque should be great enough, the cam faces may be caused to separate far enough to allow the balls to ride over their crests and in that case drive disc or cone 15 will no longer be driven and sleeve 13 will be reciprocated sufficiently to engage and reciprocate plunger 40 to operate micro-switch 42 to de-energize the drive motor (not shown) or otherwise disconnect or stop the power means.

When the device is functioning in such manner that the input torque exceeds the output torque, the axial pressure between the discs or cones 15 and 27 will be determined by the input pressure mechanism. As long as the design torque is not exceeded, the springs 14 will not yield but the cam faces of the pressure mechanism may move somewhat further apart due to the elasticity of the whole device, thus increasing the sensitivity of the mechanism to overload. Under overload torques, the springs 14 will compress as before and somewhat less compressive movement will be required of them to permit the balls 20 to ride over the pressure cams.

It will be seen from the foregoing that I utilize the cam and ball assembly of members 12, 20 and 15 for a dual purpose, both as the pressure-developing and torque-transmitting mechanism and also as the essential mechanism of the torque-limiting coupling. Ordinarily, such protective mechanism will be applied to the input side of the speed change device only, since in this location there is only one design torque value to be considered; on the output side of the device, however, the torque will vary from one-third of the rated input torque to three times the rated input torque depending upon the speed change adjustment of balls 31. It is a demonstrable fact that the pressure-developing mechanism in the speed change device subjected to the lesser torque at any one time is inoperative as a pressure building device; the pressure within the speed change device is determined by the more heavily torque loaded of the two pressure mechanisms.

In the construction illustrated, the heavier pressures developed by the pressure mechanism on the output side when the output torque exceeds the input torque is not translated through the balls 20 of the input pressure loading mechanism but is instead taken against the shoulder on the input shaft 3 and transferred to the input thrust bearings. This limits the potential pressure that the balls 20 in the input pressure mechanism must be designed to carry to one-third of that which the corresponding members 30 of the output pressure mechanism must withstand, making it feasible to employ balls on the input side whereas rollers are necessary on the output side to provide adequate strength. This is quite an advantage since the contact of the rollers 30 with the cam surfaces of the pressure mechanism is somewhat difficult to project, and a tendency may exist for such rollers to slip somewhat rather than to operate with a free rolling action. The balls 20, on the other hand, making only two points of contact, move with a rolling action which makes their torque response more sensitive.

It is not essential that back-up plate 10 and sleeve 13 be interengaged as shown and described, but if this were not the case the reaction of the preloaded springs 14 would at all times be exerted against the thrust bearings of the change speed device, detracting from the efficiency of the same under operating conditions involving light loading, as when the device is employed to increase speed. Furthermore, there might be some hazard of injury to an uninformed mechanic who might be called up to disassemble the device. Of course, sleeve 13 is adapted to be reciprocated relative to back-up plate 10 when springs 14 are further compressed, but movement of such sleeve toward disc 15 is limited by interengagement with back-up plate 10 which bears against splined shoulder 11 on shaft 3. The mechanism including such back-up plate 10, sleeve 13, cam member 12 and springs 14 accordingly functions as a solid member under all conditions of normal operation of the change speed device, but by yielding under excessive load, protects the device from damage.

Other modes of applying the principle of the invention may be employed, change being made as regards the details described, provided the features stated in any of the following claims or the equivalent of such be employed.

I therefore particularly point out and distinctly claim as my invention:

1. In a variable speed frictional drive mechanism having a drive shaft, an axially aligned driven shaft, spaced friction discs rotatably mounted on the opposed end portions of said shafts, a plurality of spherical bodies mounted and arranged frictionally to engage the respective outer peripheral portions of said discs to transmit driving force from one disc to the other, means adapted to constrain said bodies to rotate about definite axes, and means operative to tilt such axes of rotation to vary the speed transmission ratio between said discs; means for maintaining and regulating contact pressure between said discs and bodies comprising a splined shoulder on said drive shaft, a splined ring fitted on said shoulder for rotation therewith and reciprocation relative thereto, a back-up plate encircling said drive shaft adjacent said shoulder and supported against axial reciprocation, an annular sleeve on said splined ring encircling said shoulder and extending axially beyond said back-up plate, a plurality of pre-loaded compression springs engaging said ring and plate within said sleeve to urge the same apart, means on said sleeve adapted to engage said plate to limit reciprocation of said ring away from said plate and hence to hold said pre-loaded springs at all times partially compressed, a cam surface on said disc on said drive shaft comprising a plurality of alternate ridges and shallow V-shaped valleys circumferentially of said drive shaft, a similar opposed cam surface on said splined ring, balls fitted in opposed valley portions of said respective cams to transmit driving force from said drive shaft to said disc rotatably mounted thereon, whereby under conditions of excessive load said springs will be further compressed and said balls will ride up out of their valleys to disengage said drive disc from said drive shaft and avoid scoring of said spherical bodies; and means operative to interengage said driven shaft with said disc rotatably mounted thereon.

2. In a variable speed frictional drive mechanism having a drive shaft, an axially aligned driven shaft, spaced friction discs rotatably mounted on the opposed end portions of said shafts, a plurality of spherical bodies mounted and arranged frictionally to engage the respective outer peripheral portions of said discs to transmit driving force from one disc to the other, means adapted to constrain said bodies to rotate about definite axes, and means operative to tilt such axes of rotation to vary the speed transmission ratio between said discs; means for maintaining and regulating contact pressure between said discs and bodies comprising a splined shoulder on said drive shaft, a splined ring fitted on said shoulder for rotation therewith and reciprocation relative thereto, a back-up plate encircling said drive shaft adjacent said shoulder and supported against axial reciprocation, an annular sleeve on said splined ring encircling said shoulder and extending axially beyond said back-up plate, a plurality of pre-loaded compression springs engaging said ring and plate within said sleeve to urge the same apart, means on said sleeve adapted to engage said plate to limit reciprocation of said ring away from said plate and hence to hold said pre-loaded springs at all times partially compressed, a cam surface on said disc on said drive shaft comprising a plurality of alternate ridges and shallow V-shaped valleys circumferentially of said drive shaft, a similar opposed cam surface on said splined ring, balls fitted in opposed valley portions of said respective cams to transmit driving force from said drive shaft to said disc rotatably mounted thereon, whereby under conditions of excessive load said springs will be further compressed and said balls will ride up out of their valleys to disengage said drive disc from said drive shaft and avoid scoring of said spherical bodies; a micro-switch adapted to control energization of drive means for said drive shaft, a plunger mounted for reciprocation by said sleeve and adapted to actuate said switch; and means operative to interengage said driven shaft with said disc rotatably mounted thereon.

3. In a variable speed frictional drive mechanism having a drive shaft, an axially aligned driven shaft, spaced friction discs rotatably mounted on the opposed end portions of said shafts, a plurality of spherical bodies mounted and arranged frictionally to engage the respective outer peripheral portions of said discs to transmit driving force from one disc to the other, means adapted to constrain said bodies to rotate about definite axes, and means operative to tilt such axes of rotation to vary the speed transmission ratio between said discs; means for maintaining and regulating contact pressure between said discs and bodies comprising a splined shoulder on said drive shaft, a splined ring fitted on said shoulder for rotation therewith and reciprocation relative thereto, a back-up plate encircling said drive shaft adjacent said shoulder and supported against axial reciprocation, an annular sleeve on said splined ring encircling said shoulder and extending axially beyond said back-up plate, a plurality of pre-loaded compression springs engaging said ring and plate within said sleeve to urge the same apart, means on said sleeve adapted to engage said plate to limit reciprocation of said ring away from said plate and hence to hold said preloaded springs at all times partially compressed, a cam surface on said disc on said drive shaft comprising a plurality of alternate ridges and shallow V-shaped valleys circumferentially of said drive shaft, a similar opposed cam surface on said splined ring, balls fitted in opposed valley portions of said respective cams to transmit driving force from said drive shaft to said disc rotatably mounted thereon, whereby under conditions of excessive load said springs will be further compressed and said balls will ride up out of their valleys to disengage said drive disc from said drive shaft and avoid scoring of said spherical bodies; and means operative to interengage said driven shaft with said disc rotatably mounted thereon comprising a splined shoulder on said driven shaft, a splined ring interengaged thereon for rotation therewith, opposed cam surfaces on said latter splined ring and said disc on said driven shaft similar to the aforesaid cam surfaces, rollers interposed in the opposed valleys of said cam surfaces of said latter splined ring and disc, and means operatively stationary relative to said driven shaft for preventing reciprocation of the ring splined thereon away from said latter disc.

4. In a variable speed frictional drive mechanism having a drive shaft, an axially aligned driven shaft, spaced friction discs rotatably mounted on the opposed end portions of said shafts, a plurality of spherical bodies mounted and arranged frictionally to engage the respective outer peripheral portions of said discs to transmit driving force from one disc to the other, means adapted to constrain said bodies to rotate about definite axes, and means operative to tilt such axes of rotation to vary the speed transmission ratio between said discs; means for maintaining and regulating contact pressure between said discs and bodies comprising a splined shoulder on said drive shaft, a splined ring fitted on said shoulder for rotation therewith and reciprocation relative thereto, a back-up plate encircling said drive shaft adjacent said shoulder and supported against axial reciprocation, an annular sleeve on said splined ring encircling said shoulder and extending axially beyond said back-up plate, a plurality of pre-loaded compression springs engaging said ring and plate within said sleeve to urge the same apart, means on said sleeve adapted to engage said plate to limit reciprocation of said ring away from said plate and hence to hold said pre-loaded springs at all times partially compressed, a cam surface on said disc on said drive shaft comprising a plurality of alternate ridges and shallow V-shaped valleys circumferentially of said drive shaft, a similar opposed cam surface on said splined ring, balls fitted in opposed valley portions of said respective cams to transmit driving force from said drive shaft to said disc rotatably mounted thereon, whereby under conditions of excessive load said springs will be further compressed and said balls will ride up out of their valleys to disengage said drive disc from said drive shaft and avoid scoring of said spherical bodies; a micro-switch adapted to control energization of drive means for said drive shaft, a plunger mounted for reciprocation by said sleeve and adapted to actuate said switch; and means operative to interengage said driven shaft with said disc rotatably mounted thereon comprising a splined shoulder on said driven shaft, a splined ring interengaged thereon for rotation therewith, opposed cam surfaces on said latter splined ring and said disc on said driven shaft similar to the aforesaid cam surfaces, rollers interposed in the opposed valleys of said cam surfaces of said latter splined ring and disc, and means operatively stationary relative to said driven shaft for preventing reciprocation of the ring splined thereon away from said latter disc.

5. In a variable speed frictional drive mechanism having a drive shaft, an axially aligned driven shaft, spaced friction discs rotatably mounted on the opposed end portions of said shafts, a plurality of spherical bodies mounted and arranged frictionally to engage the respective outer peripheral portions of said discs to transmit driving force from one disc to the other, means adapted to constrain said bodies to rotate about definite axes, and means operative to tilt such axes of rotation to vary the speed transmission ratio between said discs; means for maintaining and regulating contact pressure between said discs and bodies comprising a shoulder on said drive shaft, a ring fitted on said shoulder for rotation therewith and reciprocation relative thereto, a plurality of pre-loaded compression springs engaging said ring, a cam surface on said disc on said drive shaft comprising a plurality of alternate ridges and shallow V-shaped valleys circumferentially of said drive shaft, a similar opposed cam surface on said ring, balls fitted in opposed valley portions of said respective cams to transmit driving force from said drive shaft to said disc rotatably mounted thereon, whereby under conditions of excessive load said springs will be further compressed and said balls will ride up out of their valleys to disengage said drive disc from said drive shaft and avoid scoring of said spherical bodies; and means operative to interengage said driven shaft with said disc rotatably mounted thereon.

6. In a variable speed frictional drive mechanism having a drive shaft, an axially aligned driven shaft, spaced friction discs rotatably mounted on the opposed end portions of said shafts, a plurality of spherical bodies mounted and arranged frictionally to engage the respective outer peripheral portions of said discs to transmit driving force from one disc to the other, means adapted to constrain said bodies to rotate about definite axes, and means operative to tilt such axes of rotation to vary the speed transmission ratio between said discs; means for maintaining and regulating contact pressure between said discs and bodies comprising a ring mounted on said drive shaft for rotation therewith and reciprocation relative thereto, a cam surface on said disc on said drive shaft comprising a plurality of alternate ridges and shallow V-shaped valleys circumferentially of said drive shaft, a similar opposed cam surfaces on said ring, camming elements fitted in opposed valley portions of said respective cam surfaces to transmit driving force from said drive shaft to said disc rotatably mounted thereon, a plurality of preloaded compression springs engaging said ring, whereby under conditions of excessive load said springs will be compressed and said camming elements will ride up out of their valleys to disengage said drive disc from said drive shaft and avoid scoring of said spherical bodies; and means operative to interengage said driven shaft with said disc rotatably mounted thereon.

7. In a variable speed frictional drive mechanism comprising a drive shaft having a drive disc rotatably mounted thereon, an axially aligned driven shaft provided with a driven disc rotatably mounted thereon in opposition to said drive disc, and a plurality of generally ball-shaped bodies mounted and arranged frictionally to engage the respective outer peripheral portions of such discs; pressure cam means interengaging said drive shaft and said drive disc rotatably mounted thereon operative to transmit torque therebetween and being adapted to develop an axial pressure proportional to the torque thus transmitted tending to disengage said drive disc and said drive shaft, and a pre-loaded resilient assembly engaging said pressure cam means adapted to exert an axial force slightly greater than that required to maintain traction in the mechanism under its maximum input torque rating, whereby an axial pressure developed by said pressure cam means in response to an input torque in excess of rated maximum value will cause said resilient assembly to yield thus disengaging said drive disc and said drive shaft and obviating scoring of said generally ball-shaped bodies.

8. In a variable speed frictional drive mechanism having a drive shaft and a friction disc rotatably mounted thereon; means for transmitting torque between said shaft and said disc comprising a splined shoulder on said shaft, a splined ring fitted on said shoulder for rotation therewith and reciprocation relative thereto, a back-up plate encircling said drive shaft adjacent said shoulder and supported against axial reciprocation, a sleeve surrounding said ring and said back-up plate, a plurality of pre-loaded compression springs engaging said ring and plate within said sleeve to urge the same apart, means on said sleeve limiting reciprocation of said ring away from said plate, a cam surface on said friction disc comprising a plurality of alternate ridges and depressions circumferentially of said drive shaft, a similar opposed cam surface on said splined ring, and balls fitted within opposed depressions of such cam surfaces to transmit driving force from said drive shaft to said disc, whereby if the axial pressure developed between said cam surfaces in such transmission exceeds the pre-load compression of said springs said balls will ride up out of their depressions and disengage said disc from said drive shaft.

9. In a variable speed frictional drive mechanism, a drive shaft having a drive disc rotatably mounted thereon, an axially aligned driven shaft rotatably mounting a driven disc, a plurality of rolling bodies frictionally engaged between such discs to transmit force therebetween, output pressure-developing cam means interengaging said driven disc and shaft, input pressure-developing cam means interengaging said drive disc and shaft, the more heavily torque loaded of such cam means developing an axial pressure proportional to the torque transmitted thereby in operation of the mechanism, means resiliently pre-loading said input pressure-developing cam means to an axial pressure slightly greater than that required to maintain traction in the mechanism under its maximum input torque rating, whereby said input pressure cam means will be unaffected by axial pressures corresponding to input torque values below such maximum but will yield when the torque transmitted by said drive shaft to said drive disc exceeds such pre-load, and means responsive to predetermined yielding of said input cam means adapted to disable drive means for the mechanism.

10. In a variable speed frictional drive mechanism, a drive shaft having a drive disc rotatably mounted thereon, an axially aligned drive shaft rotatably mounting a driven disc, a plurality of rolling bodies frictionally engaged between such discs to transmit force therebetween, output pressure-developing cam means interengaging said driven disc and shaft, input pressure-developing cam means interengaging said drive disc and shaft, the more heavily torque loaded of such cam means developing an axial pressure proportional to the torque transmitted thereby in operation of the mechanism, means transmitting the axial pressure developed by said output pressure cam means directly to the drive shaft thereby to by-pass said input pressure cam means, means resiliently pre-loading said input pressure-developing cam means to an axial pressure slightly greater than that required to maintain traction in the mechanism under its maximum input torque rating, whereby said input pressure cam means will be unaffected by axial pressures corresponding to input torque values below such maximum but will yield when the torque transmitted by said drive shaft to said drive disc exceeds such pre-load, and means responsive to predetermined yielding of said input cam means adapted to disable drive means for the mechanism.

References Cited in the file of this patent

UNITED STATES PATENTS

| Number | Name | Date |
|--------|------|------|
| 1,947,044 | Gove | Feb. 13, 1934 |
| 2,209,155 | Fagg | July 23, 1940 |
| 2,469,653 | Kopp | May 10, 1949 |
| 2,607,545 | McNabb | Aug. 19, 1952 |

FOREIGN PATENTS

| Number | Country | Date |
|--------|---------|------|
| 257,632 | Switzerland | Oct. 15, 1945 |